No. 807,166. PATENTED DEC. 12, 1905.
C. W. GRANT.
TOOL HOLDER AND TOOL.
APPLICATION FILED APR. 28, 1904.
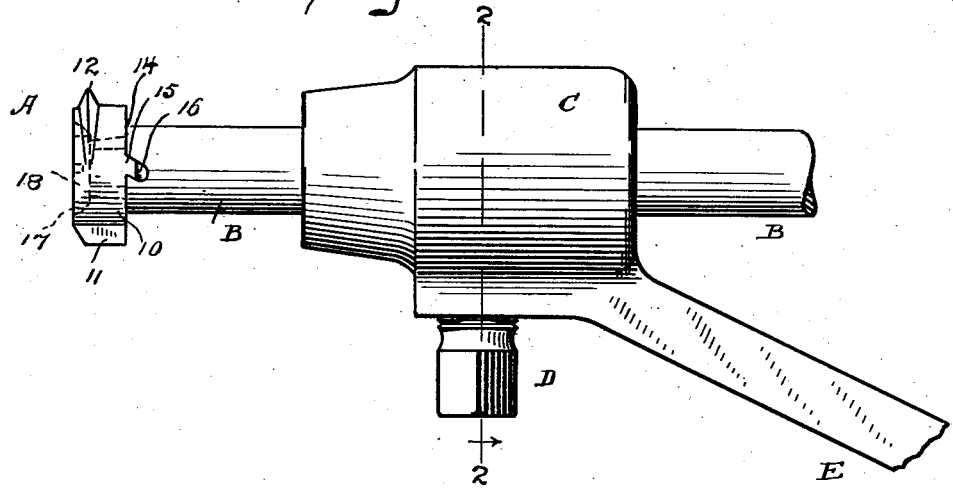
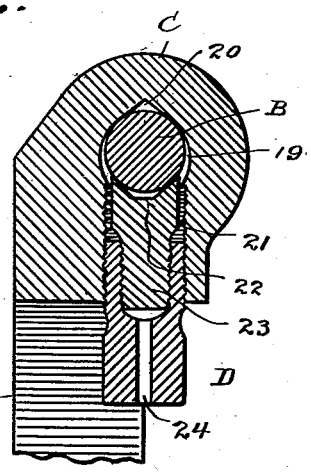
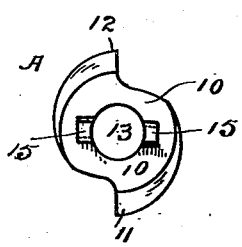
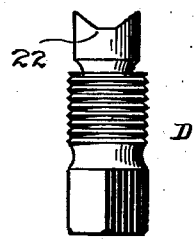
WITNESSES.
H. A. Lamb.
S. W. Atherton.
INVENTOR.
Charles W. Grant
By A. M. Wooster
Atty.

UNITED STATES PATENT OFFICE.

CHARLES W. GRANT, OF DERBY, CONNECTICUT.

TOOL-HOLDER AND TOOL.

No. 807,166.        Specification of Letters Patent.        Patented Dec. 12, 1905.

Application filed April 28, 1904. Serial No. 205,382.

*To all whom it may concern:*

Be it known that I, CHARLES W. GRANT, a citizen of the United States, residing at Derby, county of New Haven, State of Connecticut, have invented a new and useful Tool-Holder and Tool, of which the following is a specification.

My invention has for its object to provide a combined tool and holder which shall be adapted for general use, and especially adapted for use in boring and threading holes, as it enables the two operations to be performed without change of adjustment of either tool or holder. It is of course well understood that in making tools of this character "high-speed" steel, so called, which is very expensive, must be used. My present invention enables me to effect a great saving in the cost of manufacture, for the reason that only the operative portions—that is, the tool or tools proper—are made of high-speed steel, the shank, which is round, being made of a relatively low-priced steel spring-tempered, the holder being so constructed as to receive and rigidly hold different-sized tool-bars without affecting the vertical alinement.

In the accompanying drawings, forming a part of this specification, Figure 1 is an elevation illustrating my novel tool and holder; Fig. 2, a section on the line 2 2 in Fig. 1; Fig. 3, an elevation of the locking-screw detached, and Fig. 4 is a rear view of a combination-tool detached.

A denotes the tool as a whole; B, the tool-bar; C, the holder as a whole; D, the locking-screw as a whole, and E a shank extending from the holder by which it may be clamped in a tool-post. (Not shown.) If preferred, as in heavy boring, the tool-post may be discarded, and the holder may be secured to the top slide-rest of a lathe. (Not shown.) It should be understood that the special means by which my novel tool and holder are secured in place for either light or heavy work are not of the essence of the invention. For this reason I have omitted both tool-post and slide-rest from the drawings.

In the drawings I have illustrated a combined boring and threading tool—that is, a tool which is adapted to first bore a hole to the required size and then by shifting the slide-rest of the lathe and without change of adjustment of either tool or holder to thread the hole.

10 denotes the body of the tool, 11 the boring edge, and 12 the threading-cutter, said edge and cutter being on substantially opposite sides of the body. This tool is formed from high-speed steel pressed into shape while hot. The tool is provided with a central opening 13, which may be tapered slightly and receives the correspondingly-tapered end of tool-bar B, as indicated by dotted lines in Fig. 1. The tool when in place on the tool-bar rests against a shoulder 14 and is provided with rearwardly-extending oblique lugs 15, which engage corresponding recesses 16 in the tool-bar back of the shoulder. These lugs 15 may extend so as to be flush with the outer surface of the body 10, as indicated in Fig. 1, or may be shorter, so as to terminate within the said outer surface, as indicated in Fig. 4. In the outer face of the body of the tool is a recess 17, (see dotted lines in Fig. 1,) which receives the head 18 of a screw which engages the end of the tool-bar, which is preferably made round, and retains the tool rigidly in place thereon. By making the recesses in the end of the tool-bar oblique I insure that the cutter will be drawn onto the tapering end of the tool-bar and will fit snugly thereon. The holder is provided with a central opening 19, which receives the tool-bar freely. One side of this opening is made V-shaped, as at 20. Opposite the V-shaped portion of opening 19 is a threaded hole 21, which receives the locking-screw D. At the inner end of the locking-screw is a V-shaped clamping-piece 22, which lies directly opposite V-shaped portion 20 of opening 19. This clamping-piece is provided with a threaded shank 23, which engages an internal screw-thread in the end of locking-screw D. The threads upon the exterior of the locking-screw and those upon the shank of the clamping-piece are of a different pitch and may be relatively proportioned to form a differential screw adapted to give as quick or slow adjustment as may be desired and insure absolute rigidity after adjustment, as both clamping-piece and locking-screw must remain in any position in which they are placed.

24 denotes an oil-hole in the end of the locking-screw, which provides means for lubricating both sets of threads. In use in rough boring the thrust of the tool is against the body of the holder.

The operation will be readily understood from the drawings. By the use of my novel combination tool and holder two operations can be performed with but one setting. With the tool illustrated in the drawings the hole is first bored to size with boring edge 11. Then by moving the slide-rest (not shown) to shift the tool so that threading edge 12 will engage the opposite side of the hole the threading operation may be performed without shifting either tool or holder, except as they are moved with the slide-rest, the threading edge being preferably placed downward. This insures a perfectly smooth thread wholly free from chatter-marks. In the same way by the use of a different tool with suitable dissimilar cutting edges two successive operations may be performed by simple movement of the slide-rest and without changing the adjustment of tool or holder, thereby effecting a great saving of time in performing any two operations that may be required. Owing to the fact that the opening in the tool-holder is made V-shaped on one side and the clamping-piece opposite thereto is made correspondingly V-shaped, tool-bars of different size may be used in the holder without affecting the vertical alinement of the tool-bar and tool.

Having thus described my invention, I claim—

1. The combination with a tool-bar having a tapering end and radial recesses 16, of a combination-tool having a boring edge and a threading-cutter and having an opening to receive the end of the tool-bar and radial lugs to engage the recesses, and means for retaining the tool in place upon the said tapered end of the tool-bar.

2. The combination with a tool-bar having a tapering end, a shoulder and oblique recesses back of the shoulder, of a tool having an opening to receive the end of the tool-bar and oblique lugs which engage the recesses and means for retaining the tool in place upon the tool-bar.

In testimony whereof I affix my signature in presence of two witnesses.

CHARLES W. GRANT.

Witnesses:
 THOMAS MCCABE,
 JOHN H. FINN.